United States Patent Office 2,963,299
Patented Dec. 6, 1960

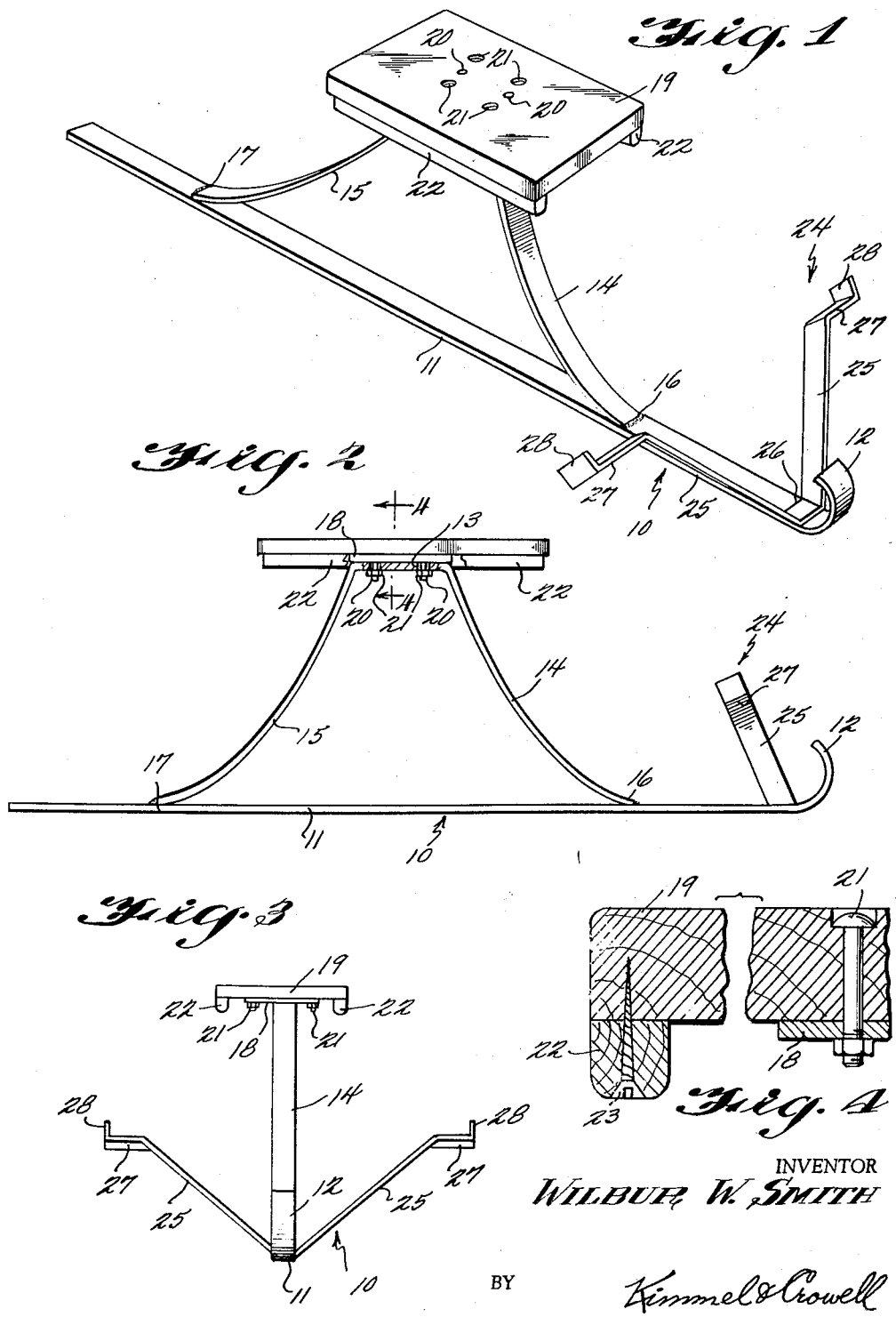

2,963,299

COMBINATION SLED-SKI

Wilbur W. Smith, R.F.D. 1, Martins Ferry, Ohio, assignor of one-third to Simon F. Carpino, Tiltonsville, Ohio Filed Jan. 26, 1959, Ser. No. 789,003

1 Claim. (Cl. 280—25)

The present invention relates to a combination sled-ski for use with the rider in a sitting position.

The primary object of the invention is to provide a combined sled-ski of the class described above having a raised seat fixed to the ski and provided with a foot rest forwardly of the seat.

Another object of the invention is to provide a combined sled-ski of the class described above having hand grips secured to the underside of the seat adjacent the opposite side edges thereof to assist the user in balancing himself on the device.

A still further object of the invention is to provide a combined sled-ski of the class described above which is inexpensive to manufacture, simple to use, and which affords a safe vehicle for use on snow slopes.

Other objects and advantages will become apparent in the following specification when considered in light of the attached drawings, in which:

Figure 1 is a perspective view of the invention;

Figure 2 is a side elevation of the invention shown partially broken away for convenience of illustration;

Figure 3 is a front elevation of the invention; and

Figure 4 is an enlarged fragmentary vertical section taken along the line 4—4 of Figure 2, looking in the direction of the arrows.

Referring now to the drawings in detail wherein like reference characters indicate like parts throughout the several figures, the reference numeral 10 indicates generally a combined sled-ski constructed in accordance with the invention.

The combined sled-ski 10 includes an elongated flat steel runner 11 having an arcuate upwardly and rearwardly curving front end portion 12 integrally formed thereon. A generally horizontal bar 13 is arranged parallel to the runner 11 and spaced a substantial distance thereabove. The bar 13 has a downwardly and forwardly sloping arcuate leg 14 integrally formed on its forward end and a downwardly and rearwardly sloping arcuate leg 15 integrally formed on its rear end.

The leg 14 has the forward lower end 16 thereof welded to the runner 11 at a point adjacent to but spaced rearwardly from the arcuate end 12 thereof. The leg 15 has the lower rear end 17 thereof welded to the runner 11 at a rearwardly spaced point from the leg 14.

A generally rectangular horizontal plate 18 is mounted on the bar 13 and has a generally rectangular flat wooden seat board 19 supported thereon. A pair of bolts 20 extend through the seat board 19, plate 18 and the bar 13, securing them together and a plurality of bolts 21 extend through the seat board 19 and the plate 18 securely fastening the seat board 19 to the plate 18.

An elongated wood handle block 22 is positioned under each side edge of the seat board 19 and secured thereto by screws 23 extending upwardly through the block 22 into the underside of the seat board 19.

A foot support, generally indicated at 24, includes a pair of upwardly and rearwardly diverging support bars 25 welded at their forward lower ends 26 to the forward end of the runner 11. Generally horizontal foot rests 27 are integrally formed on the upper ends of the bars 25 and carry integral flanges 28 on their outer ends.

In the use and operation of the invention, the rider of the combined sled-ski 10 is seated on the seat board 19 and places his feet on the foot rests 27 and grasps the handle blocks 22 in order to balance himself on the sled-ski 10, as well as to retain his seat thereon. The legs 14, 15 due to their arcuate sloping construction support the seat board 19 resiliently so as to absorb shocks which would otherwise be imparted to the rider.

The sled-ski 10 can be guided by tilting the body in the direction of the desired turn in the same general manner as the direction is controlled on skis.

Having thus described the preferred embodiment of the invention, it should be understood that numerous structural modifications and adaptations may be resorted to without departing from the scope of the appended claim.

What is claimed is:

A combined sled-ski comprising an elongated generally flat steel runner, an upwardly and rearwardly curved forward end portion integrally formed on said runner, a seat board positioned in spaced relation above said runner and parallel thereto, a pair of handle blocks secured to opposite underside portions of said seat board in depending relation thereto, means secured to said runner and to said seat board for resiliently supporting said seat board in spaced relation above said runner, said means comprising a pair of upwardly and inwardly sloping arcuate resilient legs, a generally horizontal bar integrally connecting the upper inner ends of said legs, a plate mounted on said bar, and a plurality of bolts extending through said seat board, said plate and said bar securing said seat board to said bar, and a foot rest comprising a pair of upwardly and rearwardly divergent bars having their lower ends secured to said runner, and an outwardly extending foot rest integrally secured to the upper end of each of said bars, said foot rest being secured to said runner adjacent the forward end thereof.

References Cited in the file of this patent

UNITED STATES PATENTS

| 429,265 | Fendel | June 3, 1890 |
| 2,447,700 | Hassman | Aug. 24, 1948 |

FOREIGN PATENTS

| 122,386 | Germany | July 22, 1901 |
| 224,092 | Germany | July 12, 1910 |
| 160,512 | Sweden | Sept. 17, 1957 |
| 48,291 | Switzerland | Nov. 15, 1909 |